(12) United States Patent
Aas

(10) Patent No.: US 10,282,596 B2
(45) Date of Patent: *May 7, 2019

(54) FACIAL RECOGNITION ENCODE ANALYSIS

(71) Applicant: International Business Machines Corporation, Armonk, NY (US)

(72) Inventor: Cecilia J. Aas, Saffron Walden (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/703,082

(22) Filed: Sep. 13, 2017

(65) Prior Publication Data

US 2018/0032795 A1 Feb. 1, 2018

Related U.S. Application Data

(63) Continuation of application No. 15/192,091, filed on Jun. 24, 2016.

(51) Int. Cl.
*G06K 9/00* (2006.01)
*G06K 9/62* (2006.01)

(52) U.S. Cl.
CPC ....... *G06K 9/00268* (2013.01); *G06K 9/6256* (2013.01); *G06K 2009/00328* (2013.01); *G06K 2209/27* (2013.01)

(58) Field of Classification Search
CPC ............. G06K 9/00268; G06K 9/6256; G06K 9/6265; G06K 2209/27; G06K 2009/00328
See application file for complete search history.

(56) References Cited

U.S. PATENT DOCUMENTS

| | | | |
|---|---|---|---|
| 7,155,037 B2 | 12/2006 | Nagai et al. |
| 8,340,366 B2 | 12/2012 | Masuda et al. |
| 2007/0160296 A1 | 7/2007 | Lee et al. |
| 2008/0107311 A1 | 5/2008 | Huang et al. |
| 2015/0117725 A1 | 4/2015 | He et al. |
| 2015/0131872 A1 | 5/2015 | Ganong et al. |
| 2015/0317512 A1 | 11/2015 | Shankaranarayana |
| 2016/0014038 A1 | 1/2016 | Thyagarajan et al. |

(Continued)

OTHER PUBLICATIONS

Arca, Stefano, Paola Campadelli, and Raffaella Lanzarotti. "An efficient method to detect facial fiducial points for face recognition." Pattern Recognition, 2004. ICPR 2004. Proceedings of the 17th International Conference on. vol. 1. IEEE, 2004.*

(Continued)

*Primary Examiner* — Bhavesh Mehta
*Assistant Examiner* — Menatoallah Youssef
(74) *Attorney, Agent, or Firm* — Jay Wahlquist

(57) ABSTRACT

A method for facial recognition encode analysis comprises providing a training set of Gabor encoded arrays of face images from a database; and, for each encode array in the training set, evaluating the Gabor data to determine the accuracy of the fiducial points on which the encode array is based. The method also comprises training an outlier detection algorithm based on the evaluation of the encode arrays to obtain a decision function for a strength of accuracy of fiducial points in the encode arrays; and outputting the decision function for application to an encode array to be tested.

5 Claims, 5 Drawing Sheets

(56) References Cited

U.S. PATENT DOCUMENTS

2017/0286751 A1  10/2017  Hayduke

OTHER PUBLICATIONS

Beirão, Céu L., and Mário AT Figueiredo. "Defect detection in textile images using Gabor filters." International Conference Image Analysis and Recognition. Springer, Berlin, Heidelberg, 2004.).*

Arca, et al., "A face recognition system based on automatically determined facial fiducial points", Pattern Recognition, vol. 39, Issue 3, Mar. 2006. http://www.sciencedirect.com/science/article/pii/S0031320305002669 Last accessed Jun. 23, 2016, 10:54 AM. 2 pages.

Kriegel, et al.,"Outlier Detection Techniques", 2010 SIAM International Conference on Data Mining. Columbus, Ohio. 73 pages.

Naruniec, et al., "Face Detection by Discrete Gabor Jets and Reference Graph of Fiducial Points", RKST 2007, LNAI 4481. 8 pages.

Peng, et al., "A Robust Algorithm for Eye Detection on Gray Intensity Face without Spectacles", JCS&T vol. 5, No. 3. Oct. 2005. 6 pages.

Vukadinovic, et al., "Fully Automatic Facial Feature Point Detection Using Gabor Feature Based Boosted Classifiers", 2005 IEEE International Conference on Systems, Man and Cybernetics. Waikoloa, Hawaii Oct. 10-12, 2005. 7 pages.

Unknown, "Gabor wavelet", Wikipedia, the free encyclopedia. https://en.wikipedia.org/wiki/Gabor_wavelet Last accessed Jun. 3, 2016, 9:53 AM. 3 pages.

Unknown, "Gabor filter", Wikipedia, the free encyclopedia. https://en.wikipedia.org/wiki/Gabor_filter Last accessed Jun. 3, 2016, 9:54 AM. 5 pages.

List of IBM Patents or Patent Applications Treated as Related, Sep. 12, 2017. 2 pages.

Aas, "Facial Recognition Encode Analysis", U.S. Appl. No. 15/192,091, filed Jun. 24, 2016.

* cited by examiner

FACIAL RECOGNITION ENCODE ANALYSIS

BACKGROUND

The present invention relates to facial recognition encode analysis, and more specifically, to identifying poorly located fiducial points in a face image of an encode.

In face recognition, the sheer pixel values of a facial image provide relatively little recognition information. Instead, most face recognition engines rely on extracting features from the image, i.e., some higher-level properties of the image. The recognition process then relies on comparing the images in terms of these high-level features.

Fiducial points are points in a field of view, in this case a face, used as a reference for measurement. In facial recognition, fiducial points that are used may be based on the eyes, nose, mid-point between the eyes, and mouth. Facial recognition often uses a pattern of sampling points defined on a face relative to the fiducial points.

SUMMARY

Aspects of the disclosure provide a method, system, and computer program product for facial recognition encode analysis. In one embodiment, the method comprises providing a training set of Gabor encoded arrays of face images from a database; and, for each encode array in the training set, evaluating the Gabor data to determine the accuracy of the fiducial points on which the encode array is based. The method also comprises training an outlier detection algorithm based on the evaluation of the encode arrays to obtain a decision function for a strength of accuracy of fiducial points in the encode arrays; and outputting the decision function for application to an encode array to be tested.

BRIEF DESCRIPTION OF THE DRAWINGS

Understanding that the drawings depict only exemplary embodiments and are not therefore to be considered limiting in scope, the exemplary embodiments will be described with additional specificity and detail through the use of the accompanying drawings, in which.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

DETAILED DESCRIPTION

In many face recognition systems, facial images are processed to extract features that may be some higher-level properties of the image. The recognition process then relies on comparing the images in terms of these high-level features.

Gabor wavelet responses are often the higher-level properties of choice for face recognition systems. This is mainly because the Gabor wavelet closely mimics processes in the visual cortex of mammals, including humans.

In image processing, a Gabor filter is a linear filter used for edge detection. Frequency and orientation representations of Gabor filters are similar to those of the human visual system, and they have been found to be particularly appropriate for texture representation and discrimination. In the spatial domain, a 2D Gabor filter is a Gaussian kernel function modulated by a sinusoidal plane wave. Simple cells in the visual cortex of mammalian brains can be modeled by Gabor functions. Thus, image analysis with Gabor filters is thought to be similar to perception in the human visual system.

A set of Gabor filters with different frequencies and orientations may be helpful for extracting useful features from an image. In the discrete domain, two-dimensional Gabor filters are given by:

$$G_c[i, j] = Be^{-\frac{(i^2+j^2)}{2\sigma^2}} \cos(2\pi f(i\cos\theta + j\sin\theta)) \quad \text{Equation (1)}$$

$$G_s[i, j] = Ce^{-\frac{(i^2+j^2)}{2\sigma^2}} \sin(2\pi f(i\cos\theta + j\sin\theta)) \quad \text{Equation (2)}$$

where B and C are normalizing factors to be determined. 2-D Gabor filters have rich applications in image processing, especially in feature extraction for texture analysis and segmentation. f defines the frequency being looked for in the texture. By varying θ, we can look for texture oriented in a particular direction. By varying σ, we change the support of the basis or the size of the image region being analyzed.

Typically, in such Gabor-based face recognition systems, the image is converted to grey scale and the fiducial points, for example, eyes, nose, mid-point between eyes, mouth, are located either manually by a user or automatically by machine learning approaches.

Figure 1:
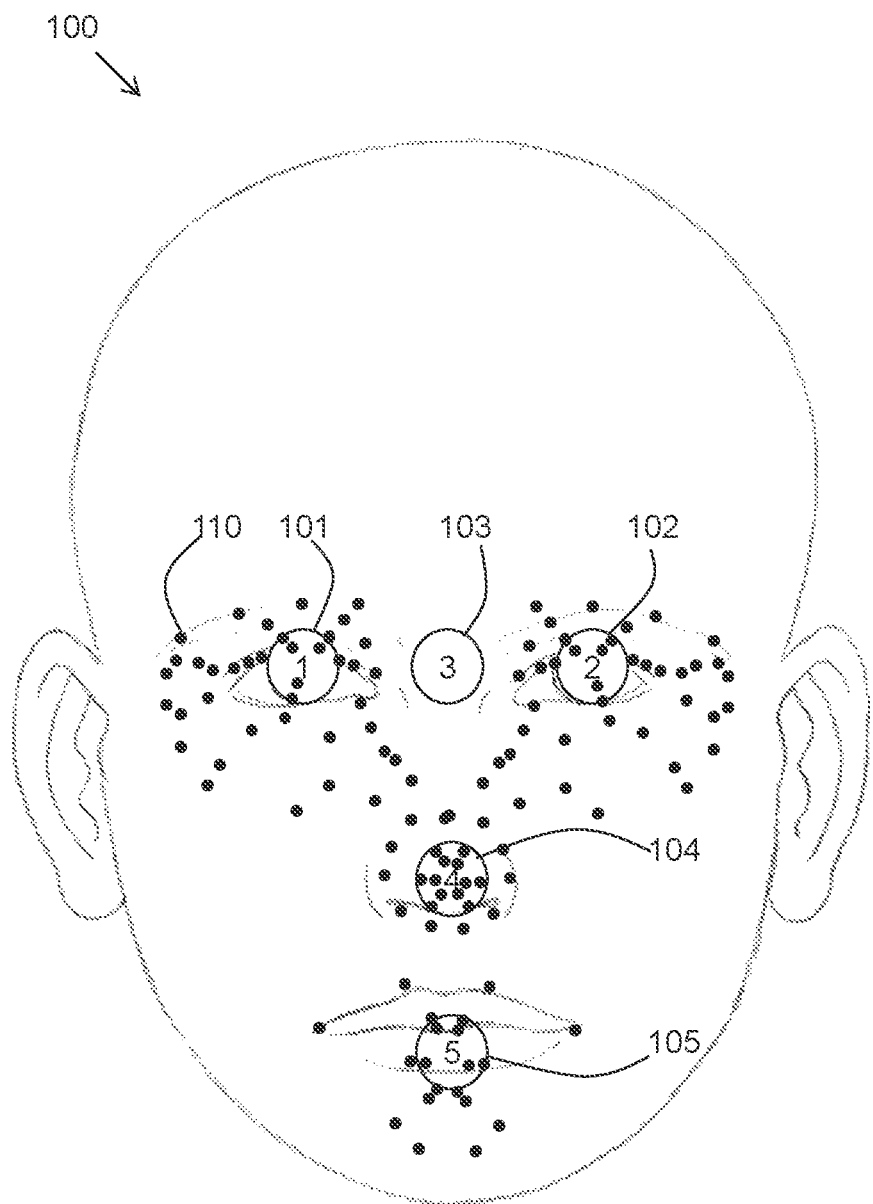
FIG. 1 is a schematic diagram showing an example face image with fiducial points used as references for sampling points.

Relative to these fiducial points, a pattern of sampling points is defined on the face. FIG. 1 shows an example face image 100 with fiducial points at the eyes 101, 102, a mid-point between the eyes 103, the nose 104, and the mouth 105. Sampling points 110 are shown as black dots in a pattern around the fiducial points.

At each sampling point, the response of the pixel values at that particular sampling point to different kinds of Gabor wavelets is evaluated. These Gabor responses then form the "encode" of the face. The encode is the higher-level computational representation of the face used for the recognition process. In the following, the process of extracting Gabor responses from an image is referred to as the encoding process.

One criteria for Gabor-based face recognition systems to work well is that the eyes and nose locations are correctly identified on the image before the encoding process is performed. Incorrect fiducial point locations distort the pattern of locations at which the Gabor responses are evaluated. Incorrect fiducial location may cause a particular face recognition deployment to exhibit poor performance.

However, for typical sizes of face recognition databases it becomes impractically laborious to go through each image by hand to check if the identified fiducial locations actually correspond correctly to the eyes/nose/mouth/etc. on the actual facial image.

The described method and system provide a way of determining, post-encode, whether an encode has resulted from a poor choice of fiducial points or a good choice of fiducial points. A diagnostic tool can be provided to determine whether or not incorrect fiducial points are the issue with a particular, poorly performing deployment. Flagging up suspect images for manual improvement of fiducial point locations (rather than going through all images to check for fiducial point errors) can substantially reduce the man-hours required to improve the face recognition performance on a given database.

The described method and system use the data and metadata contained in the encoding process itself to evaluate a mathematical confidence as to whether or not the fiducial points were correctly located at the time of encoding.

In addition to providing information useful in comparing faces, certain patterns and properties of the data and metadata provided by the Gabor encoding process are used herein to indicate whether a face has been correctly identified.

The following data and metadata extracted from the encoding process is harnessed to classify an encode as "bad", i.e., performed using poorly located fiducial points, or "good", i.e., performed using well located fiducial points. Features used to classify an encode are:

The Gabor responses of particular Gabor wavelet frequencies, averaged across multiple sampling points on the face. The more sampling points used gives a stronger output. In one embodiment, all sampling points may be averaged.

The correlation between the Gabor response values between pairs of sampling points that are related through facial symmetry or spatial overlap.

It has been found that good encodes cluster in a relatively narrow region, the "normal" region, of values of the above two features. Bad encodes can thus often be detected by their falling outside the "normal" region. By training an outlier detection algorithm, the "normal" region may be determined for all of the above features in a computationally efficient way. In statistics, an outlier is an observation point that is distant from other observations and outlier detection is a family of machine learning algorithms Outlier detection algorithms generate a decision function in the form of a matrix A. When matrix A is applied to the vector of feature values of a given encode, the sign of the answer (positive or negative) indicates whether, according to the outlier detection algorithm, the sample (encode) is inside (good encode) or outside (bad encode) the "normal" region.

The embodiments of the method and system described herein utilize the above features of Gabor response encodes for determining whether the encoding process was performed on correctly or incorrectly located fiducial points.

Figure 2:
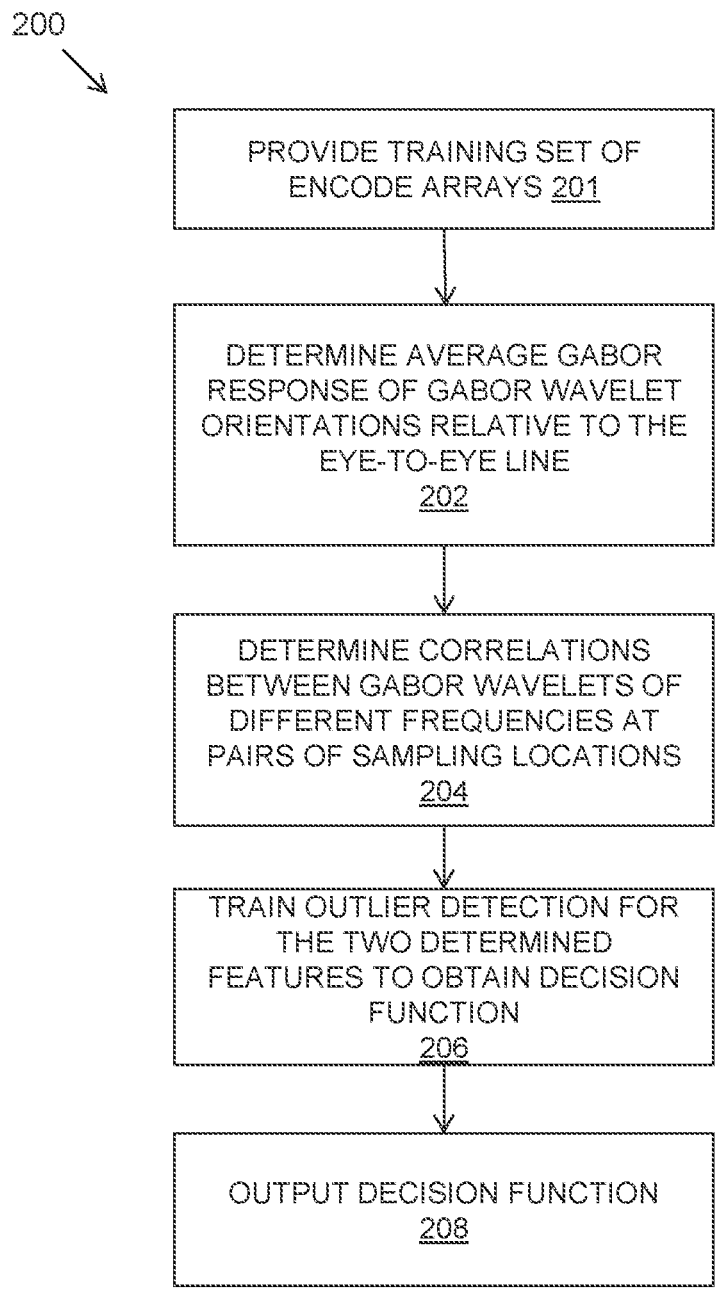
FIG. 2 is a flow diagram of one embodiment of an example method of determining whether an encoding process was performed on correctly or incorrectly located fiducial points.

Referring to FIG. 2, a flow diagram 200 shows an example embodiment of a method of determining whether an encoding process was performed on correctly or incorrectly located fiducial points.

At block 201, a training set of encode arrays is provided for face images in a database. In some embodiments, the training data can be obtained, for example, as a large number of encode arrays from known "good" encodes (that is, encodes resulting from correctly identified fiducial locations) that were harvested by hand. Alternatively, assuming the number of "bad" encodes (that is, encodes resulting from incorrectly identified fiducial locations) is small, all of the encode arrays for the training set may be harvested from a database.

For each encode array in the training set, the Gabor data is evaluated to determine the accuracy of the fiducial points on which the encode array is based. In particular, the evaluation includes determining an average Gabor response at block 202, across all sampling locations on the face, for each of the following Gabor wavelet orientations relative to the eye-to-eye horizontal line: where angle $\theta$ =0, pi/6, pi/3, pi/2, 2*pi/3, 5*pi/6, wherein angle $\theta$ is provided the Gabor wavelet equations shown at Equations (1) and (2).

The evaluation also includes determining, at block 204, the correlations between Gabor wavelet of different frequencies at pairs of sampling locations related through facial symmetry or spatial overlap. For example, if two sampling points are supposed to be at symmetrical places on each side of the nose, their Gabor overlap values should be correlated; if these values are not correlated, then the sampling pattern is probably corrupted due to incorrect placing of the fiducial points.

An outlier detection algorithm is trained at block 206 based on the results of the analysis at blocks 202 and 204. Although the method 200 is described using both the analysis at block 202 and the analysis at block 204, it is to be understood that, in other embodiments, the evaluation of the training set can include only the analysis at block 202 or the analysis at block 206. Hence, the training of the outlier detection algorithm can be based only the analysis at block 202 or at block 204, in some embodiments.

The outlier detection algorithm decides what the support of the good data is, i.e., what region in parameter-space encloses all or most of the good data. In essence, it "draws a line" around the region of parameter space that contains most of the good data and labels that region as the normal region. This region can be determined based on identifying a region which contains a specific percentage of the good data (e.g. 75%, 80%, 90%, etc.). The percentage of the good data contained in this region is a parameter of the algorithm and can vary based on the given implementation.

The usefulness of the output provided by the outlier detection algorithm is improved when a parameter space is identified where all the good data is in a well-located sub-region of that parameter space. In this case, the parameter space created by evaluating the quantities mentioned at 202 and 204 is a suitable parameter space in this regard.

A decision function based on training the outlier detection algorithm is output at block 208. The decision function represents the border between the "normal" region as described above and any other parts of the parameter space. The decision function is determined such that:

when it is applied to a sample which falls outside the normal region, it returns a negative scalar value (this is a "bad" encode);

when it is applied to a sample which falls inside the normal region, it returns a positive scalar value (this is a "good" encode);

when it is applied to a sample right on the normal/non-normal boundary, it returns zero (this encode cannot be classified as good/bad).

The output decision function is used to decide whether or not a given encode array is a good or bad encode array. This will indicate whether the fiducial points on that image are likely well or poorly located.

Figure 3:
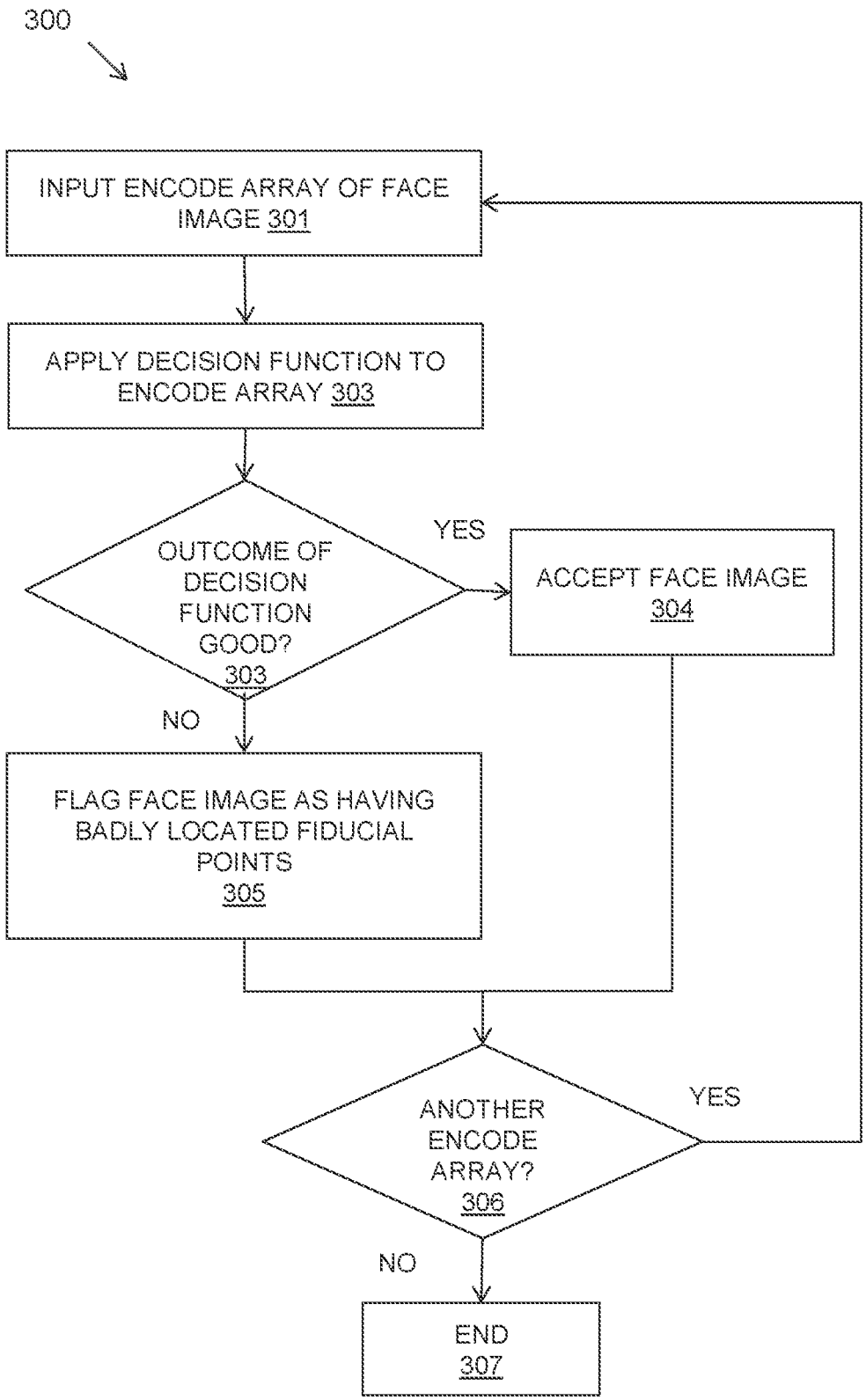
FIG. 3 is a flow diagram of one embodiment of an example method of applying a decision function to test a given encode array.

FIG. 3 depicts a flow diagram of one embodiment of an example method 300 of applying the obtained decision function from FIG. 2 to test a given encode array. In particular, the method 300 determines whether a given encode array was performed on correctly or incorrectly located fiducial points.

An encode array of a face image is input at block 301. At block 302, the decision function is applied to the encode array. Applying the decision function to the encode array results in either a positive scalar value, a negative scalar value, or a zero value, as discussed above. At block 303, it is determined if the outcome of the decision function indicates a good encode or a bad encode based on the scalar value result from block 302. If the outcome of the decision function indicates a good encode, the encode array or the face image to which it relates is accepted at block 304 or otherwise indicated as a good sample.

If the outcome of the decision function indicates a bad encode, the encode array or the face image to which it relates is flagged at block 305 as having badly located fiducial points. It is then determined at block 306 if there is another encode array to assess. If so, the method loops to input the next encode array at block 301. If not, the method ends at block 307.

The decision function can be used to provide a diagnostic as to whether the poor performance of face recognition on a given database of encodes/images is due to poorly located fiducial points.

The decision function can also be used to flag up database images that have poorly located fiducial points for manual correction of the fiducial points.

The decision function can also be used to provide a tool for indicating to a user in real time whether the selected (automatically or manually) fiducial points are likely to be good or bad (i.e., whether the fiducial points need correction before enrolling the image on the database).

The described method and system use particular kinds of data and metadata from a Gabor encoding process in order to determine whether or not the fiducial points were correctly located at the time of encoding (i.e., whether we are representing a correct face or not).

Instead of attempting to improve the automatic detection of fiducial points in the first place, the method concentrates on detecting badly located fiducial points post-encoding. This approach enables the improvement of existing face recognition deployments where thousands or millions of images have already been encoded using an existing method of fiducial point identification.

The described method improves face recognition performance on a given, deployed face recognition database where the images have already been encoded. The method is also a time and labor saving measure for automatically diagnosing whether erroneous fiducial points may be an issue with a given face recognition database and flagging individual database images that have incorrectly placed fiducial points and that need manual correction.

Figure 4:
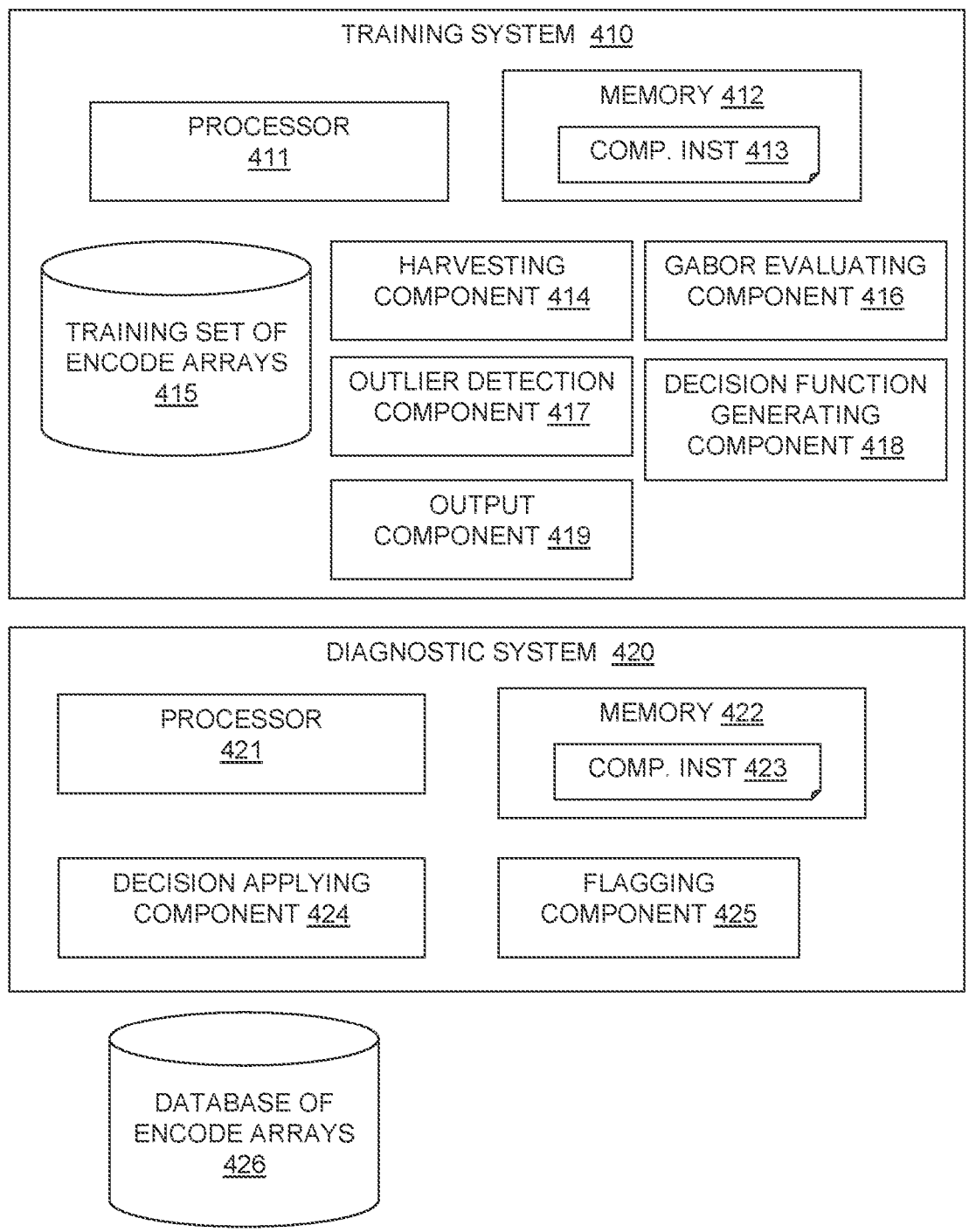
FIG. 4 is block diagram of one embodiment of an example system for facial recognition encode analysis.

Referring to FIG. 4, a system 400 is provided for facial recognition encode analysis. The system 400 includes a training system 410 and a diagnostic system 420. The training system 410 can be provided as a stand-alone component, in some embodiments, for obtaining a decision function for applying to a facial recognition database. In alternative embodiments, the training system 410 is incorporated into a facial recognition system. The diagnostic system 420 applies the decision function to a facial recognition database. Although depicted as physically separate components in this example, it is to be understood that, in other embodiments, the training system 410 and the diagnostic system 420 can be implemented as a single component.

The training system 410 includes at least one processor 411, a hardware module, or a circuit for executing the functions of the described components of the training system 410 which may be software units executing on the at least one processor 411. Multiple processors running parallel processing threads may be provided enabling parallel processing of some or all of the functions of the components. Memory 412 is configured to provide computer instructions 413 to the at least one processor 411 to carry out the functionality of the components of the training system 410 discussed below (e.g. components 414, 416, 417, 418, and 419). For example, the computer instructions 413 when executed by the at least one processor 411 cause the at least one processor 411 to perform one or more of the functions discussed above with respect to FIG. 2.

The training system 410 includes a harvesting component 414 for harvesting encode arrays with good fiducial points for a training set 415 of Gabor encoded arrays of face images. The training set 415 can be obtained as a large amount of encode arrays from known "good" encodes harvested by hand, in some embodiments.

The training system 410 includes a Gabor evaluating component 416 for evaluating the Gabor data for each encode array in the training set 415 to determine the accuracy of the fiducial points on which the encode array is based. The training system 410 also includes an outlier detection component 417 for training an outlier detection algorithm for the evaluations of the encode arrays.

The training system 410 includes a decision function generating component 418 for obtaining a decision function for a strength of accuracy of fiducial points in the encode arrays and an output component 419 for outputting the decision function for application to an encode array to be tested.

The diagnostic system 420 may include at least one processor 421, a hardware module, or a circuit for executing the functions of the described components of the diagnostic system 420 which may be software units executing on the at least one processor 421. Multiple processors running parallel processing threads may be provided enabling parallel processing of some or all of the functions of the components. Memory 422 is configured to provide computer instructions 423 to the at least one processor 421 to carry out the functionality of the components of the diagnostic system 420. For example, the computer instructions 423 when executed by the at least one processor 421 cause the at least one processor 421 to perform one or more of the functions discussed above with respect to FIG. 3.

The diagnostic system 420 includes a decision applying component 424 for applying the decision function to an encode array to be tested for determining from the outcome of the decision function whether the encode array is based on a face image with good fiducial point locations. For example, the decision applying component 424 implements the functionality of blocks 301 to 304 of FIG. 3, in some embodiments.

The diagnostic system 420 also includes a flagging component 425 for flagging a face image of an encode array if the outcome of the decision function shows the encode array does not have good fiducial point locations. For example, the flagging component 425 implements the functionality of block 305, in some embodiments.

The diagnostic system 420 can be used to provide a diagnostic as to whether the poor performance of face recognition on a given database 426 of encode arrays is due to poorly located fiducial points.

The diagnostic system 420 can be a real time tool and the decision function can be used for indicating in real time whether the selected fiducial points are good or bad in an encode array of a face image and whether the fiducial points need correction before enrolling the face image on a database 426.

Figure 5:
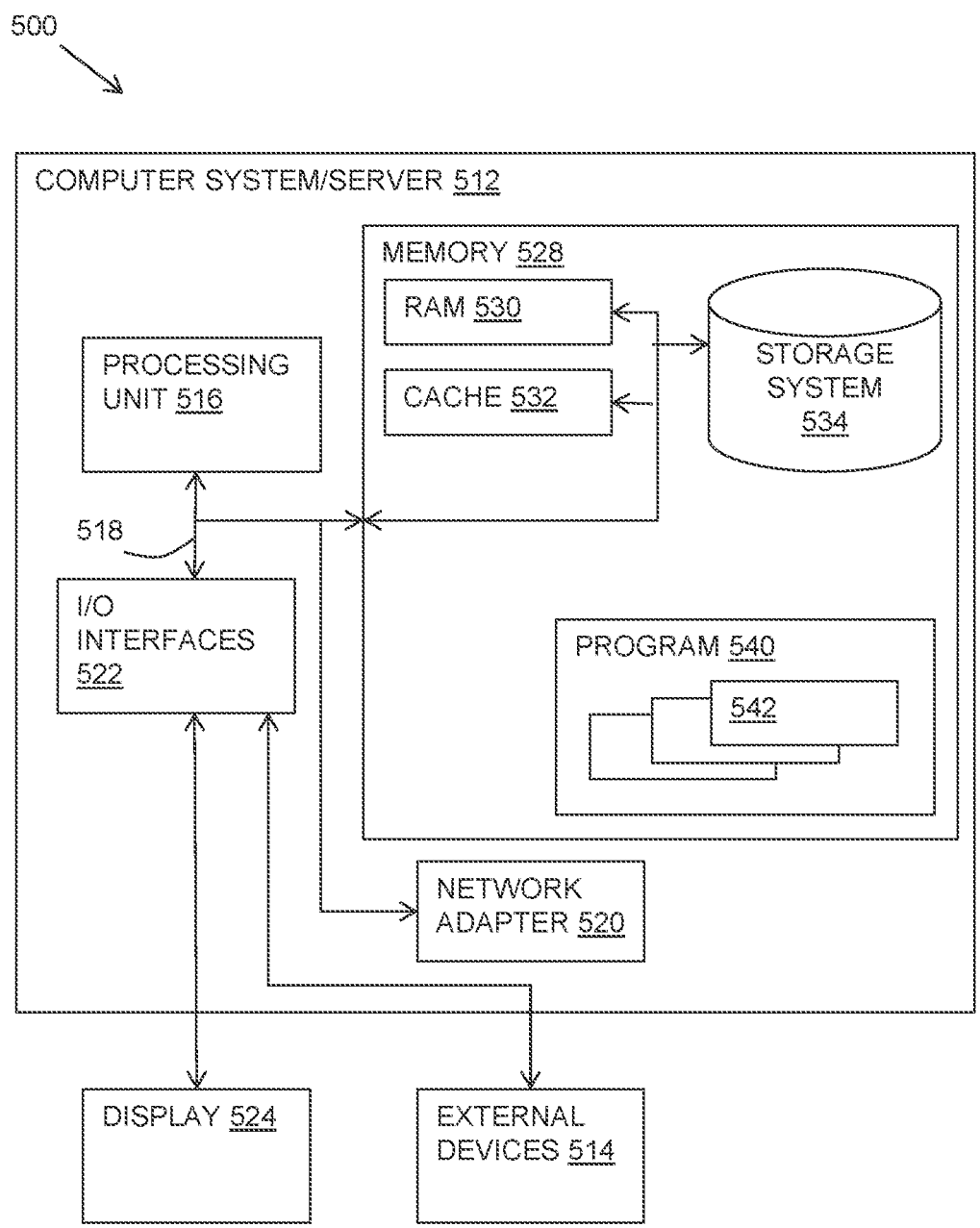
FIG. 5 is a block diagram of another embodiment of an example computer system facial recognition encode analysis.

Referring now to FIG. 5, a schematic of an example of a system 500 in the form of a computer system or server is shown.

A computer system or server 512 may be operational with numerous other general purpose or special purpose computing system environments or configurations. Examples of well-known computing systems, environments, and/or configurations that may be suitable for use with computer system/server 512 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 512 may be described in the general context of computer system-executable instructions, such as program modules, being executed by a computer system. Generally, program modules can include routines, programs, objects, components, logic, data structures, and so on that perform particular tasks or implement particular abstract data types. Computer system/server 512 can be implemented in distributed cloud computing environments, in some embodiments, where tasks are performed by remote processing devices that are linked through a communications network. In a distributed cloud computing environment, program modules can be located in both local and remote computer system storage media including memory storage devices.

In FIG. 5, a computer system/server 512 is shown in the form of a general-purpose computing device. The components of the computer system/server 512 can include, but are not limited to, one or more processors or processing units 516, a system memory 528, and a bus 518 that couples various system components including system memory 528 to processor 516.

Bus 518 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 512 typically includes a variety of computer system readable media. Such media may be any available media that is accessible by computer system/server 512, and it includes both volatile and non-volatile media, removable and non-removable media.

System memory 528 can include computer system readable media in the form of volatile memory, such as random access memory (RAM) 530 and/or cache memory 532. Computer system/server 512 can further include other removable/non-removable, volatile/non-volatile computer system storage media. By way of example only, storage system 534 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 518 by one or more data media interfaces. As will be further depicted and described below, memory 528 may include at least one program product having a set (e.g., at least one) of program modules that are configured to carry out the functions of embodiments of the invention.

Program/utility 540, having a set (at least one) of program modules 542, may be stored in memory 528 by way of example, and not limitation, as well as an operating system, one or more application programs, other program modules, and program data. Each of the operating system, one or more application programs, other program modules, and program data or some combination thereof, may include an implementation of a networking environment. Program modules 542 generally carry out the functions and/or methodologies of embodiments described herein.

Computer system/server 512 may also communicate with one or more external devices 514 such as a keyboard, a pointing device, a display 524, etc.; one or more devices that enable a user to interact with computer system/server 512; and/or any devices (e.g., network card, modem, etc.) that enable computer system/server 512 to communicate with one or more other computing devices. Such communication can occur via Input/Output (I/O) interfaces 522. Still yet, computer system/server 512 can communicate with one or more networks such as a local area network (LAN), a general wide area network (WAN), and/or a public network (e.g., the Internet) via network adapter 520. As depicted, network adapter 520 communicates with the other components of computer system/server 512 via bus 518. It should be understood that although not shown, other hardware and/or software components could be used in conjunction with computer system/server 512. Examples, include, but are not limited to: microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Improvements and modifications can be made to the foregoing without departing from the scope of the present invention.

What is claimed is:

1. A computer-implemented method for facial recognition encode analysis, comprising:
   providing a training set of Gabor encoded arrays of face images from a database;
   for each encode array in the training set, evaluating the Gabor data to determine the accuracy of the fiducial points on which the encode array is based;
   training an outlier detection algorithm based on the evaluation of the encode arrays to obtain a decision function for a strength of accuracy of fiducial points in the encode arrays; and
   outputting the decision function for application to an encode array to be tested;
   applying the decision function to an encode array to be tested;

determining from the outcome of the decision function whether the encode array is based on a face image with good fiducial point locations: and flagging a face image of an encode array in response to determining that the outcome of the decision function shows the encode array does not have good fiducial point locations.

2. The method as claimed in claim 1, wherein evaluating the Gabor data to determine the accuracy of the fiducial points on which the encode array is based includes determining an average across multiple sampling locations of a face image of a Gabor response for multiple Gabor wavelet orientations relative to an eye-to-eye horizontal line of the face image.

3. The method as claimed in claim 2, wherein the multiple Gabor wavelet orientations are where angle $\theta=0$, pi/6, pi/3, pi/2, 2*pi/3, and 5*pi/6.

4. The method as claimed in claim 1, wherein evaluating the Gabor data to determine the accuracy of the fiducial points on which the encode array is based includes determining a set of correlations between Gabor wavelets of different frequencies at pairs of sampling locations related through facial symmetry or spatial overlap in the face.

5. The method as claimed in claim 1, wherein the decision function is configured to:
   return a negative scalar value when applied to a sample encode array which falls outside a normal region of the outlier detection algorithm;
   return a positive scalar value when applied to a sample encode array which falls inside the normal region; and
   return a zero value when applied to a sample encode array on a boundary of the normal region.

* * * * *